UNITED STATES PATENT OFFICE.

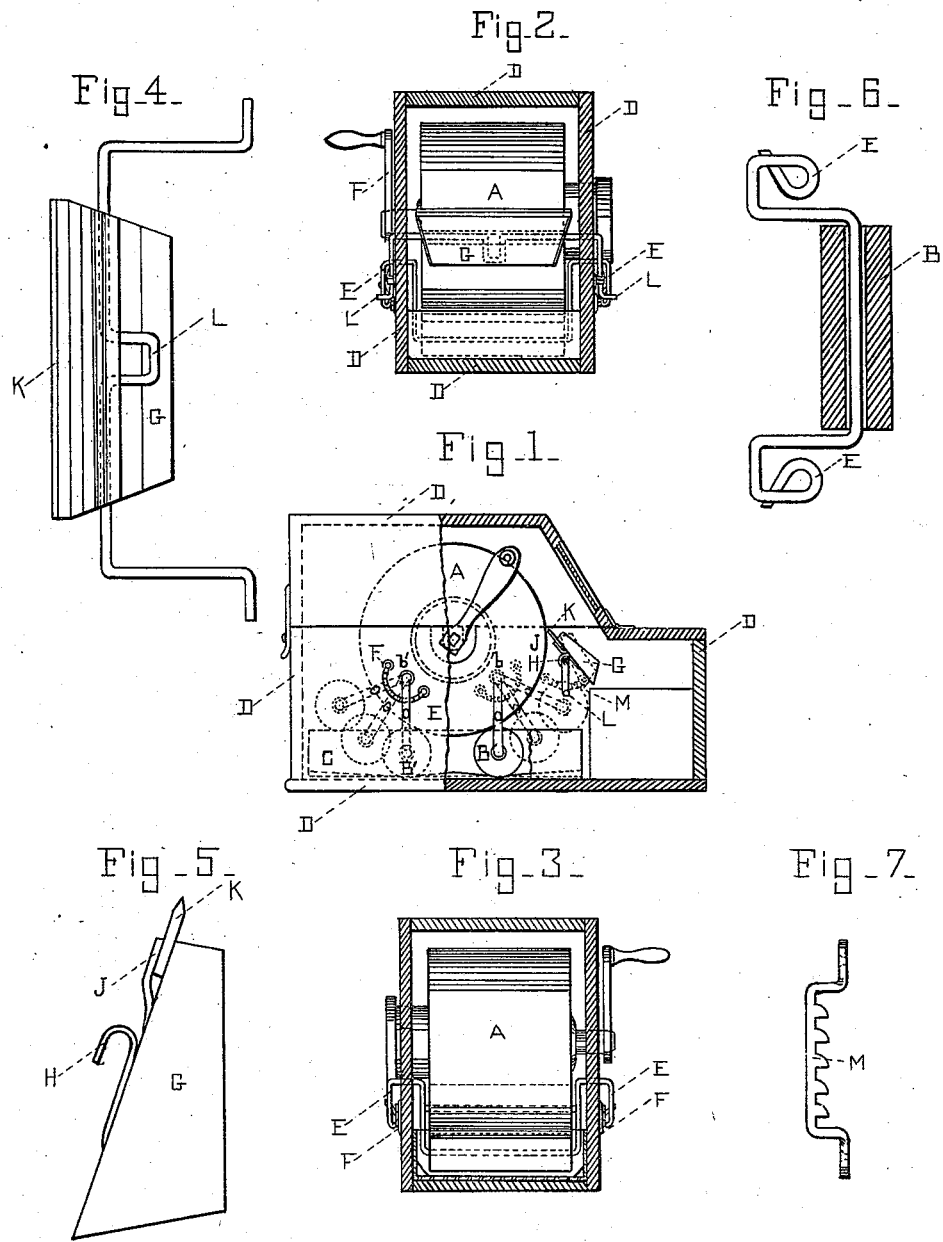

WILLIAM BENTON McCANN, OF PHILADELPHIA, PENNSYLVANIA, ASSIGNOR TO GEORGE C. COURTRIGHT AND JOHN D. FULMER, OF SAME PLACE.

ICE-CREAM FREEZER.

SPECIFICATION forming part of Letters Patent No. 555,523, dated March 3, 1896.

Application filed February 26, 1895. Serial No. 539,817. (No model.)

*To all whom it may concern:*

Be it known that I, WILLIAM BENTON MC-CANN, a citizen of the United States, residing at Philadelphia, county of Philadelphia, and State of Pennsylvania, have invented new and useful Improvements in Devices for Ice-Cream Freezers, of which the following is a specification.

My invention has for its object certain improvements in that class of ice-cream freezers which consist of a horizontally-rotating cylinder containing the freezing agent in combination with a cream-receiving pan, feeding-rollers, and a scraper to remove the ice-cream as made.

My improvements relate to the devices for delivering the unfrozen cream, custard, or like material to the periphery of the freezing-cylinder and for collecting therefrom the finished product.

It is all-important to the character of the cream and other liquids frozen that they be perfectly smooth in the grain and free from ice crystals perceptible to the tongue. This is the principal point to be acquired for excellence. The desirable smoothness and fineness of grain can only be attained when the material to be frozen is thinly and uniformly laid upon the face of the periphery of the revolving cylinder. It is in this particular where so much failure has occurred in ice-cream machines of this class, many different styles of which have been invented and patented within the last few years.

Those machines which are constructed to allow the revolving cylinder to run directly into and through the cream in the receiving-pan beneath and to take up much or little as it chances cannot make fine ice-cream, because the supply is overabundant and not uniform. This defect is partially remedied by one or more feed-rollers placed either in the cream-pan or in connection with it beneath the cylinder and actuated by frictional contact with it. By this means an even and uniform layer or layers of the material to be frozen are transferred to the periphery of the revolving cylinder when all the conditions for success are present. It is a great advance upon the machine with no feed-roller, but it is not perfect. Experience has taught me that the devices which feed or deliver the cream to the periphery of the cylinder must be adjustable to meet all the conditions of the machine. Why this adjustment is necessary is that when the revoluble cylinder is charged with the freezing mixture and is at rest none of the material to be frozen should come in contact with it, for the reason that where it does it makes ice or freezes into a thick layer, which spoils the smooth grain so essential to the highest grades of ice-cream and like products. It is only when the cylinder is in motion that the materials to be frozen should be laid as a thin film upon its periphery.

My other object is to remove said ice-cream when made from the periphery of the cylinder in such a manner as will give perfect results. In this matter also there is much room for improvement. The devices used are principally scrapers which are fixed to bear an edge upon the face of the periphery of the cylinder and remove the cream formed upon it. The fault with them mainly is that they do not scrape the said face uniformly, and frequently scrape off portions of the tinning material with which it is coated. I overcome this defect by an improvement in the construction of my scraper and in the means for operating and controlling it, so that its tension may be readily regulated by the operator of the machine when the same is in motion.

In explanation of my devices I refer to the accompanying drawings, in which—

Figure 1 is a side elevation in section of an ice-cream freezer of the style described with a portion of the side of the case D removed. Fig. 2 is a front end sectional elevation showing position of the scraper G. Fig. 3 is a rear end sectional elevation showing different positions of the feed-roller B, the same being indicated by dotted lines, except when in the lowest position, where the roller is shown in a positive sectional outline. Fig. 4 is a view of the back side of the scraper G mounted upon the carrying-rod L. Fig. 5 is an end view in outline of the scraper G, showing hook H and pocket J, into which is fitted the scraping member or blade K. Fig. 6 shows a sectional view of the feed-roller B as carried upon the frame E. Fig. 7 is a side view of the ratchet-rack M.

I prefer two feed-rollers B and B', one on each side of the vertical axis of the freezing-cylinder A, and dipping into two different cream-pans or into opposite portions of one cream-pan C, situate beneath said cylinder, which pan may be divided by a partition into two separate vessels to hold two different flavors of cream mixtures. I journal these feed-rollers, which are preferably of wood, with a smooth bore through their cores, upon frames of stout galvanized wire, which frames are formed by bending said wire, first, near to said rollers and at right angles to their axes, and, secondly, after a certain distance, again at right angles in the same plane as the first bend. I now run the ends of said wire through holes oppositely placed in the sides of the case D, which, when done, I again bend the wire downwardly at right angles forming the arms E, which may be terminated in any proper manner for a finish, but preferably with the spring-loops, as shown, to engage with the ratchet-racks F and F' on the opposite outsides of the case D. The shape here described is particularly exhibited in Fig. 6. The holes b and b' in the sides of the case D which form the journals for the said roller-frames must be placed with due regard to the length of the inside arms of the frames and the circumference of the freezing-cylinder A, in order that the frames which work in them may be moved tangentially—that is, within a narrow compass—to the said periphery and carry the feed-rollers close to or away from (within the said narrow compass) the said periphery, according to the position of the arms E. This operation is crudely indicated in Fig. 1, where the rollers B and B' are shown in different positions with regard to the periphery of the freezing-cylinder, the first position being low in the cream-pan C, where they are in close contact with said periphery, the second position being just above it, still in the cream-pan, but removed from said close contact, and the third position where they are removed from the cream-pan altogther and do not come into contact with said periphery. The operation of this arrangement is that when the cream-pan is full one feed-roller may be lifted entirely out of said pan and out of contact with the cylinder, while the other roller may be dipped deep enough in the cream mixture to gather a sufficient quantity to transfer to the revolving cylinder which, in this position, is in working contact. When the cylinder has been revolved two or three times and the ice-cream upon its periphery has gathered thickness by each additional film laid upon it, then roller No. B may be lifted a little in the cream and at the same time roller No. B' on the opposite side of the cylinder may be brought into contact and add its film to the increasing thickness of ice-cream forming on said periphery. Then the scraper G may be brought to bear upon said periphery and remove a portion or all of the ice-cream formed thereon. When the freezing-cylinder is first charged with the ice and salt the refrigerating conditions are at their best, and the two feed-rollers may used and adjusted, as described above, to quickly and advantageously produce the ice-cream, but as the ice becomes exhausted in the cylinder and its powers sink one feed-roller alone may be used to the best advantage. Practice will determine this.

It will be observed that the feed-rollers are controlled entirely by the arms on the outsides of the case, and that all necessary adjustments of the same may be made while the cylinder is revolving.

My scraper G is in the form of a chute as wide as the width of the smooth face of the periphery of the freezing-cylinder, with raised sides made by bending same at right angles to the main piece. Block-tin is perhaps the best material out of which to construct it, because it is cheap, smooth, and clean. Upon the back side of said main piece I solder near and along its top a strip bent to form the pocket J, (the main piece forming one of its sides,) into which I slip a tightly-fitting blade K, made of any suitable material, but preferably of polished bone, hard gutta-percha, or the like, the upper edge of which, where it comes in contact with the face of the periphery of the freezing-cylinder, being beveled or chamfered to engage with and lift off the ice-cream formed on said face as said freezing-cylinder is turned against said scraping device. Why I prefer to use bone or the like for this purpose is that it will not scrape the said face as metal does. I have found by experience that the tinning of such cylinders is frequently worn away by constant use and is mingled with the ice-cream to its great detriment, rendering it unfit for consumption. Below said pocket on said back side I solder the hook H to loosely engage with and rest upon the carrying-rod L. Said carrying-rod is simply a piece of strong wire journaled in holes in each side of the case D, bent for about one-fourth its length where it comes beneath the scraper in the form of a double crank, and where it emerges from said case again bent downwardly at right angles to form the arms L. These arms are engaged with ratchet-racks M, fastened to said case on each of its sides, and they may be moved backward and forward within the compass of said rack. This form of constructing said carrying-rod enables the operator by merely moving said arms within said ratchet-racks to positively control and adjust the scraper so that it may be pressed firmly or lightly against the face of the freezing-cylinder, or altogether removed from contact with it as he may desire without opening the case or stopping the revolution of the cylinder.

Why I prefer to construct my scraper with a hook-formed device to engage with the carrying-rod and not to have it more substantially attached to the same is that it may be easily removed when the machine is opened that it may be cleaned. Perfect sweetness and cleanness is a very desirable condition in ice-cream-making machines, and I seek to obtain it both by the character of the materials used and the manner in which they are combined in the construction of my scraper.

I am aware that the feature of the carrying-rod upon which the scraper is mounted with ends projecting outside the case and held in a ratchet-rack is not new, and I do not broadly claim it; but

Having now fully described my invention, what I claim, and desire to secure by Letters Patent, is—

1. In an ice-cream freezer of the style described the combination with the freezing-cylinder and cream-pan of feed-rollers and frames carrying said rollers and journaled eccentrically to the cylinder so as to permit the rollers to be swung into and removed from contact with both the said cylinder and the cream-pan beneath same, substantially as shown and described.

2. In combination with a freezing-cylinder, a scraper arranged to take the frozen cream therefrom, a hook fastened to the back of the said scraper, a carrying-rod arranged to be engaged by the said hook allowing the convenient removal of the said scraper at will and means engaging with the said carrying-rod to regulate the proximity of the edge of the scraper to the said cylinder substantially as set forth.

WILLIAM BENTON McCANN.

Witnesses:
JAS. U. ROBERTSON,
WILLIAM PFEIFFER.